June 28, 1955 T. S. TEETOR 2,712,093

CIRCUIT FOR SUPPRESSING UNDESIRED RIPPLE VOLTAGE
IN POWER OUTPUT TUBE OF DEFLECTION
SYSTEM FOR TELEVISION RECEIVER

Filed Aug. 9, 1954

INVENTOR
THOMAS S. TEETOR

BY Alden D. Redfield.
Charles M. Hogan.
ATTORNEYS.

United States Patent Office 2,712,093

Patented June 28, 1955

2,712,093

CIRCUIT FOR SUPPRESSING UNDESIRED RIPPLE VOLTAGE IN POWER OUTPUT TUBE OF DEFLECTION SYSTEM FOR TELEVISION RECEIVER

Thomas S. Teetor, Cincinnati, Ohio, assignor to Avco Manufacturing Corporation, Cincinnati, Ohio, a corporation of Delaware Application August 9, 1954, Serial No. 448,707

7 Claims. (Cl. 315—27)

Figure 1:
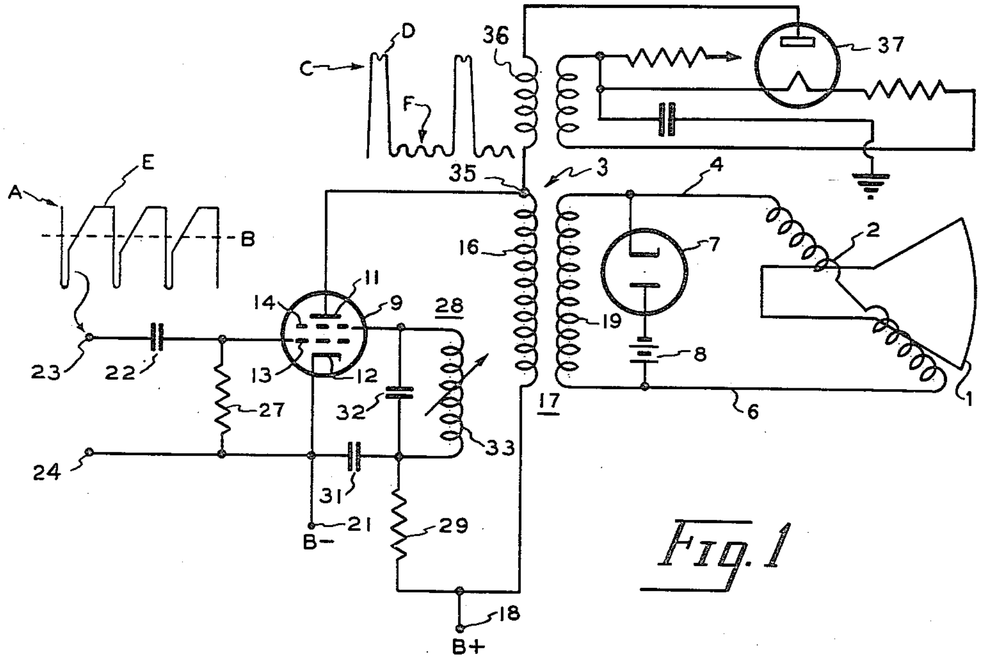

The present invention relates generally to scanning or sweep voltage amplifiers for cathode ray tube systems, and in particular to high efficiency beam deflection amplifiers for use in cathode ray tube systems employing magnetic deflection of the electron beam of the cathode ray tube. Amplifiers in accordance with the present invention may find particular application as horizontal deflection amplifiers of the type employed in television receivers.

Deflection voltage amplifiers of the type with which the present invention is concerned may employ multigrid electron amplifier tubes, such as tetrodes. An output transformer for the deflection amplifier has its primary circuit connected in the plate circuit of the tetrode, and the deflection coils of a cathode ray tube system are connected to a secondary circuit of the transformer. It has been found that the inductances and stray and interwinding and distributed capacitances of output transformer systems commonly employed in deflection circuit of the type briefly described herein, constitute a first resonant circuit which may be resonant at a frequency between approximately 50 and 60 kilocycles per second. The transformer system includes the output transformer, damper, deflection yoke, and associated connections and stray and distributed capacitances. During operation of the scanning or sweep amplifier, a train of cyclically recurring sweep voltage input pulses is commonly applied to the control grid of the amplifier tube, which pulses are suitably shaped to generate sawtooth current flow in the deflection coils of the cathode ray tube system. Voltage supplies and impedances associated with the amplifier tube may be so chosen that the plate voltage during a portion of each input pulse is slightly above the knee of the plate current v. plate voltage characteristic of the amplifier tube. The output pulses appearing in the plate circuit of the tube shock excite the transformer, thereby causing oscillations at the resonant frequency of the transformer system to be produced in the transformer system.

Oscillations of the last-mentioned frequency—i. e., 50 to 60 kilocycles per second, are damped out by the damper tube. On the other hand, third harmonic oscillations are produced in a second resonant circuit by shock excitation. This second resonant circuit comprises the primary transformer section which is connected to the high voltage supply rectifier, together with the distributed capacitance of such section. This second resonant circuit is tuned to the order of the third harmonic for the purpose of enhancing the effectiveness of the high voltage supply system. Reference to third harmonic herein is intended to be illustrative and not to constitute a rigid limitation. These harmonics are reflected into the amplifier plate circuit and are not damped. These oscillations produce in such plate circuit a ripple voltage on the order of 100–200 kilocycles in frequency. The negative excursions of this ripple voltage drive the total plate voltage below the knee of the plate characteristic curve, producing sharp decreases in plate current. In a multigrid tube, the total current arriving in the region of the screen grid depends primarily on the screen grid voltage and therefore remains essentially constant during variations in plate voltage. However, the total current is partitioned between the screen grid and the plate in accordance with their relative voltages, and when the plate current decreases sharply during negative half cycles of the ripple voltage, there occurs a transfer of plate current to the screen grid, producing a sharp increase in the screen grid current. During the positive excursions of the ripple voltage, the total plate voltage rises above the knee of the plate characteristic curve and the plate current increases to its original value, while the screen grid current correspondingly decreases. The ripple voltage, therefore, causes rapid switching of low velocity electrons between the screen grid and the plate of the tube at the ripple voltage frequency.

The inter-electrode capacitance between the screen grid and the plate, and the stray capacitances and inductances of the leads and other circuit elements associated with the screen grid and plate have been found to constitute, in certain specific circuits of the type described, a third resonant circuit in the V. H. F. (very-high-frequency) and U. H. F. (ultra-high-frequency) range. The rapid switching of electrons, at a 200 kilocycle per second rate, between the plate and screen grid of the tube shock-excites this third resonant circuit at the ripple voltage frequency of 200 kilocycles, thereby causing very-high-frequency and ultra-high-frequency oscillations to occur at high amplitude at frequencies from 50 to 1000 megacycles per second. If the sweep circuit is part of a receiver, as, for example, the horizontal sweep circuit of a television receiver, and if the receiver is tuned to a carrier frequency corresponding with the frequency of the oscillations, the V. H. F. and U. H. F. oscillations will produce a response in the video channel of the receiver, and hence picture interference.

In accordance with the present invention, the rapid interchange or switching of low velocity electrons between the screen grid and the plate, the cause of which has been above described, is eliminated, or reduced to a negligible magnitude, by connecting a parallel resonant circuit tuned to the ripple frequency, or an equivalent high impedance, in the screen grid supply circuit. The resonant circuit presents a high impedance to the ripple frequency in the screen grid supply circuit and thereby serves to minimize or to reduce to a negligible value switching of current between the screen grid and plate at this third-harmonic frequency.

It is, accordingly, a broad object of the present invention to eliminate high-frequency switching of electrons between the screen grid and plate of a pulsed voltage amplifier tube, due to ripple voltage at the plate of the amplifier tube.

It is another object of the present invention to prevent picture interference in a television receiver, resulting from high-frequency switching or interchange of electrons between the screen grid and plate of a deflection amplifier of the receiver.

Still another object of the present invention is to provide a parallel resonant circuit in a supply circuit of the screen grid of a screen grid amplifier tube arranged to provide deflection currents to a cathode ray tube system, as a device for eliminating parasitic oscillations in the amplifier.

Figure 2:
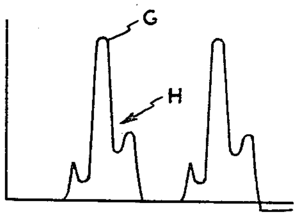
Figure 3:
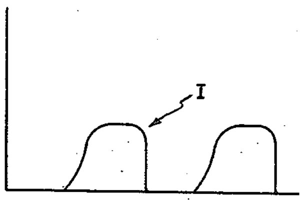

The above and still further features, objects, and advantages of the present invention will become apparent upon consideration of the following detailed description of a specific embodiment of the invention, especially when taken in conjunction with the accompanying drawings, wherein:

Fig. 1 is a schematic circuit diagram of a horizontal cathode ray deflection system incorporating the present invention; and Figs. 2 and 3 are wave forms of currents, which are utilized in connection with the description of the operation of the present invention.

Referring now more particularly to Fig. 1 of the accompanying drawings, there is shown a schematic circuit diagram of an electromagnetic beam deflection system for use in a cathode ray tube system. More particularly, the system may be included in a television receiver, as a horizontal deflection device. The reference numeral 1 identifies generally a cathode ray tube, of the character conventionally employed in television receivers. The cathode ray tube may be provided with electron beam forming and accelerating electrodes, a beam intensity grid, voltage input terminals and the like, which are omitted from the drawings for the sake of clarity of illustration. The cathode ray tube 1 has associated therewith deflection coils 2, which deflect the electron beam when supplied with the requisite current pulses. A deflection amplifier, generally designated 3, provides the requisite current pulses on output leads 4 and 6. Output leads 4 and 6 are connected to opposite ends of deflection coils 2. A clamping diode 7 and a bias supply 8 are connected in series across the deflection coils 2, the cathode of the diode 7 being connected to lead 4 and the positive side of the bias supply 8 being connected to lead 6.

The horizontal deflection amplifier 3 includes a multigrid electron tube 9 having a plate 11, cathode 12, control grid 13, and screen grid 14. Plate 11 of tube 9 is connected through a primary winding 16 of a transformer 17 to a positive terminal 18 of a plate voltage supply. The transformer 17 has a secondary winding 19 which is connected between the output leads 4 and 6 of the horizontal deflection amplifier 3. The inductances and stray and inter-winding capacitances inherent in the transformer 17 and the transformer system in certain specific circuits encountered in practical applications of the invention, have been found to be such that the transformer system is resonant at a frequency between 50 and 60 kilocycles per second.

The usual high voltage system is shown, including section 36 of the primary of transformer 17 and the usual rectifier tube 37, connected in conventional fashion. Section 36 and its distributed capacitance are tuned to resonate at the third harmonic of the 50–60 kilocycle fundamental.

Referring again to the electron tube 9, the cathode 12 is directly connected to a negative terminal 21 of the plate voltage source. The control grid 13 of the tube 9 is connected through a coupling capacitor 22 to an input terminal 23, to which may be applied input pulses A. A second input terminal 24 is connected to the negative terminal 21 of the plate voltage supply. A grid bias resistor 27 is connected between the grid 13 and the cathode 12 of the tube 9. The grid bias resistor establishes a bias on the grid 13 such that only those portions of the wave form A lying above the dashed horizontal line B produce conduction in the tube 9.

The screen grid 14 of the tube 9 is connected to one terminal of a parallel resonant circuit 28. The remaining terminal of the parallel resonant circuit 28 is connected through a voltage dropping resistor 29 to the positive terminal 18 of the plate voltage supply. A screen grid by-pass capacitor 31 is connected between the cathode 12 of the tube 9 and the junction of the resistor 29 and the parallel resonant circuit 28. The parallel resonant circuit 28 consists of a capacitor 32 connected in parallel with a variable tuning inductor 33, and is tuned to the ripple voltage frequency on the order of 200 kilocycles per second, which approximates the high-voltage power supply resonance frequency.

The inter-electrode capacitance between the screen grid 14 and the plate 11 of the tube 9 and the stray capacitances and inductances of the leads and elements associated with the screen grid 14 and plate 11 in specific circuits encountered in practical embodiments of the present system have been found, as indicated above, to be such as to constitute a circuit resonant at a frequency between approximately 50 and 1000 megacycles per second, subject to excitation by the third-harmonic ripple voltage from the high voltage supply system.

During operation of the circuit, input voltage pulses A are applied between the input terminals 23 and 24. The input voltage pulses initially swing negative with respect to the dashed horizontal line B, which indicates the cut-off level of the tube 9, and conduction through the tube 9 ceases. As a result the plate voltage, the wave form of which is illustrated at C, rises rapidly to a maximum value D equal to the value of the plate supply voltage. The input pulses thereafter rapidly increase in magnitude to a maximum amplitude E. The maximum amplitude of the input voltage pulses in the positive direction is such that in response thereto the plate voltage decreases to a value just above the knee of the plate characteristic curve of the tube 9. The rapid variations in plate voltage, responsive to the input pulses A, shock-excite the transformer 17 system, causing it to resonate at a frequency between 50 and 60 kilocycles per second. The third-harmonic oscillatory voltage from the high voltage supply system appears on transformer primary 16, as a ripple voltage F, superposed on the normal plate voltage of the tube 9. The negative excursions of the ripple voltage are sufficiently large to drive the composite plate voltage below the knee of the plate characteristic curve of the tube 9, thereby producing sharp decreases in plate current. However, since the current arriving in the region of the screen grid 14 is substantially independent of the relatively small changes in plate voltage corresponding with the ripple frequency voltage, there is a sharp increase in the screen grid current corresponding with the decrease in plate current. This increase in screen grid current is indicated by a large peak G in screen grid wave form H. During the positive excursions of the ripple voltage, the plate voltage is driven over the knee of the plate characteristic curve of the tube 9 and the current to the plate 11 increases sharply, the screen grid current correspondingly decreasing. Therefore, the ripple voltage produces a switching or inter-change of low velocity electrons between the screen grid 14 and the plate 11 at a frequency on the order of 200 kilocycles per second.

The third resonant circuit made up of the inter-electrode capacitance between the plate 11 and the screen grid 14 and the stray capacitances and inductances of the leads and other elements of the circuit associated with the screen grid 14 and the plate 11 is shock-excited by the rapid switching of electrons between the screen grid 14 and the plate 11. This resonant circuit tends to produce oscillations at a frequency in the range of 50 to 1000 megacycles per second. If a deflection system of this character were incorporated in a television receiver, and the receiver tuned to a frequency which corresponds with the resonant frequency of the last-mentioned resonant circuit, the oscillations will appear in the video channel of the receiver and produce picture interference. This interference may be eliminated in accordance with the present invention, by employing the parallel resonant circuit 28 which is connected in the screen grid supply circuit. The parallel resonant circuit 28 is tuned by means of the variable inductor 33 to a resonant frequency on the order of 200 kilocycles per second, and presents a high impedance in the screen grid supply circuit in the region of the ripple frequency. This high impedance prevents the switching or interchange of current between the screen grid and plate at the frequency of the third-harmonic ripple voltage and therefore prevents excitation of the screen grid-plate resonant circuit.

The wave form H, Fig. 2, illustrates the screen grid current when the resonant circuit 28 is omitted, while wave I, Fig. 3, illustrates the screen grid current when the resonant circuit 28 is included, in the voltage supply circuit of screen grid 14. It will be noted that the sharp current peaks G have been eliminated and a peak-free screen current is obtained. Since the sharp current peaks G at the screen grid 14 are responsible for shock exciting the screen grid-plate resonant circuit, the elimination of these peaks will substantially reduce the tendency of the circuit to oscillate in the 50 and 1000 megacycle region.

The operation of the remainder of the circuit is well known in the television art. The diode 7 and bias supply 8 are utilized to damp oscillations of the fundamental frequency which are set up in deflection coils 2 as a result of the sudden reduction in deflection coil current during the fly-back period. The bias supply 8 is used to set the conduction level of the diode 7 at a value that does not disturb the deflection voltage during the linear portion of the deflection cycle.

Although the tube 9 illustrated in the schematic circuit diagram is a tetrode, the present invention finds application in deflection amplifiers employing other tube types which may be subject to high-frequency switching of electrons between the screen grid and plate of the tube.

While I have described and illustrated a specific embodiment of the present invention, it will be apparent that variations of the general arrangement may be resorted to without departing from the true spirit and scope of the invention as defined in the appended claims.

I claim:

1. A cathode ray tube scanning circuit comprising a cathode ray tube, means for forming a cathode ray beam, deflection coil means for deflecting the cathode ray beam, an electron tube having at least a plate and a screen grid, a transformer system having an input circuit and an output circuit, a high voltage supply circuit, the inductance and capacitance of said supply circuit being such as to provide a resonant circuit at a predetermined frequency approximating the third harmonic of the natural frequency of the transformer system, means connecting said input circuit to said plate, means connecting said deflection coil means to said output circuit and means having a high impedance at the resonant frequency of said supply circuit connected in series with said screen grid, the last-named resonant frequency being of a higher order than the scanning frequency.

2. A cathode ray tube scanning circuit comprising a cathode ray tube having means for forming a cathode ray beam, deflection coil means for deflecting said cathode ray beam, an electron tube having at least a plate and a screen grid, a transformer system having an input circuit and an output circuit, a high voltage supply circuit, the inductance and capacitance of said supply circuit providing a resonant circuit at a predetermined frequency approximating the third harmonic of the natural frequency of the transformer system, means connecting said input circuit in series with said plate, means connecting said deflection coil means to said output circuit, a parallel resonant circuit tuned to said predetermined frequency, and means connecting said parallel-resonant circuit in series with said screen grid, said predetermined frequency being of a higher order than the scanning frequency.

3. A cathode ray tube scanning circuit comprising a cathode ray tube having means for forming a cathode ray beam, deflection coil means for deflecting said cathode ray beam, an electron tube having at least a plate and a screen grid, a transformer system having an input circuit and an output circuit, a high voltage supply circuit, inductances and capacitances of said supply circuit providing a circuit resonant at a frequency in the radio-frequency region which is of a higher order than the scanning frequency and approximates the third harmonic of the natural frequency of the transformer system, means connecting said input circuit to said plate, means connecting said deflection coil means to said output circuit, a parallel resonant circuit tuned to the frequency of said circuit resonant at a frequency in the radio-frequency region, and means connecting said parallel resonant circuit to said screen grid.

4. A cathode ray tube scanning circuit comprising a cathode ray tube having means for forming a cathode ray beam, deflection coil means for deflecting the cathode ray beam, an electron tube having at least a plate, a control grid, and a screen grid, a high voltage supply circuit, a transformer system having an input circuit and an output circuit, inductances and capacitances of said high voltage supply circuit constituting a circuit resonant at a frequency in the radio-frequency region which is of a higher order than the scanning frequency and approximates the third harmonic of the natural frequency of the transformer system, a plate circuit including said input circuit, means connecting said plate circuit to said plate, means connecting said deflection coil means in said output circuit, means connecting said control grid to receive a train of voltage pulses, means for causing the plate voltage to fall to a value just above the knee of the plate characteristic curve of said electron tube during a portion of each input pulse cycle, the output voltage variations on said plate causing said supply circuit to resonate and produce an oscillatory voltage on said plate which periodically drives the plate voltage below the knee of the plate characteristic curve, thereby tending to cause switching of current between said plate and said screen grid, and means for preventing said switching including a parallel resonant circuit tuned to the resonant frequency of said supply circuit and connected in series with said screen grid.

5. A cathode ray tube scanning circuit comprising a cathode ray tube having means for forming and accelerating a cathode ray beam, deflection coil means for deflecting said cathode ray beam, an electronic amplifier tube having at least a plate, a screen grid, and a control grid, a transformer system having an input circuit and an output circuit, the transformer system being resonant at a frequency between 50 and 60 kilocycles per second, a high voltage supply circuit resonant at the third harmonic of said frequency, which third harmonic is of a higher order than the scanning frequency, means connecting said input circuit in series with said plate, means connecting said deflection coil means to said output circuit, the inter-electrode capacitance between said plate and said screen grid and the stray capacitances and inductances of the circuit elements associated with said plate and said screen grid being such as to constitute a plate-screen grid resonant circuit which is resonant at a frequency between 50 and 1000 megacycles per second, means connecting said control grid to receive input voltage pulses, means causing the voltage on said plate to reach a value slightly above the knee of the plate characteristic curve of said tube during a portion of each input pulse cycle, the output voltage variations of said plate causing said supply circuit to resonate and produce an oscillatory voltage on said plate which periodically drives the voltage of said plate below the knee of the plate characteristic curve of said tube, thereby tending to provide switching of electrons between said plate and said screen grid and oscillations of said plate-screen grid resonant circuit, means for reducing the amplitude of said oscillations comprising circuit means having a high impedance at said third harmonic frequency and means connecting said last-mentioned means in series with said screen grid.

6. The combination in accordance with claim 5 wherein said circuit means comprises a parallel resonant circuit having means for tuning said parallel resonant circuit to the resonant frequency of said voltage supply system.

7. A cathode ray tube deflection circuit comprising a cathode ray tube having cathode ray beam forming and accelerating elements, deflection coil means for deflecting the cathode ray beam, an electron tube having at least a cathode, a control grid, a screen grid, and a plate, a high voltage supply system, a transformer system having an input and an output circuit, the high voltage supply system being resonant at a predetermined frequency of a higher order than the deflection frequency and approximating the third harmonic of the natural frequency of said transformer system, a positive and a negative terminal of a plate voltage supply, means connecting said input circuit of said transformer between said plate and said positive terminal, means connecting said deflection coil means in said output circuit of said transformer, means connecting said cathode to said negative terminal, a grid bias resistor, means connecting said grid bias resistor between said control grid and said cathode, a parallel resonant circuit tuned to the resonant frequency of said supply system, a dropping resistor, means connecting said parallel resonant circuit and said dropping resistor in series between said screen grid and said positive terminal with said screen grid connected to one end of said parallel resonant circuit, and a by-pass capacitor connected between said cathode and the junction of said parallel resonant circuit and said dropping resistor.

References Cited in the file of this patent

UNITED STATES PATENTS

| | | |
|---|---|---|
| 2,552,884 | Cannon | May 15, 1951 |
| 2,579,627 | Tourshou | Dec. 25, 1951 |
| 2,664,521 | Schlesinger | Dec. 29, 1953 |